United States Patent
Haberland et al.

(10) Patent No.: US 10,039,122 B2
(45) Date of Patent: Jul. 31, 2018

(54) SCHEDULING VIRTUALIZATION FOR MOBILE CLOUD FOR LOW LATENCY BACKHAUL

(71) Applicant: Alcatel Lucent, Boulogne Billancourt (FR)

(72) Inventors: Bernd Haberland, Stuttgart (DE); Heidrun Grob-Lipski, Stuttgart (DE); Thomas Werthmann, Stuttgart (DE); Vikas Dhingra, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 15/021,019

(22) PCT Filed: May 13, 2014

(86) PCT No.: PCT/EP2014/059746
§ 371 (c)(1),
(2) Date: Mar. 10, 2016

(87) PCT Pub. No.: WO2015/036133
PCT Pub. Date: Mar. 19, 2015

(65) Prior Publication Data
US 2016/0227555 A1    Aug. 4, 2016

(30) Foreign Application Priority Data
Sep. 12, 2013 (EP) ..................................... 13290217

(51) Int. Cl.
*H04W 72/12* (2009.01)
*H04W 88/08* (2009.01)

(52) U.S. Cl.
CPC .......... *H04W 72/12* (2013.01); *H04W 88/085* (2013.01)

(58) Field of Classification Search
None
See application file for complete search history.

(56) References Cited

U.S. PATENT DOCUMENTS 7,277,446 B1   10/2007   Abi-Nassif et al.
7,453,801 B2   11/2008   Taneja et al.
(Continued)

FOREIGN PATENT DOCUMENTS

EP   2 592 863 A1   5/2013
JP   2006-521063 A   9/2006
(Continued)

OTHER PUBLICATIONS

Bernd Haberland et al., "Radio Base Stations in the Cloud," Bell Labs Technical Journal 18(1), pp. 129-152, XP055098994, 2013.
(Continued)

*Primary Examiner* — Anh Ngoc Nguyen
(74) *Attorney, Agent, or Firm* — Fay Sharpe, LLP

(57) ABSTRACT

The present disclosure relates to a baseband processing assembly (100, 200, 300) for processing signals of at least one remote radio head (104), the at least one remote radio head (104) serving a radio cell (105) of a cellular communication system, the baseband processing assembly (100, 200, 300) comprising a set of user packet schedulers (107A-M) and a cell packet scheduler (109), wherein the cell packet scheduler (109) is assigned to the radio cell (105), wherein the set of user packet schedulers (107A-M) are assigned to a group of users (101A-N) associated to the radio cell (105), wherein the cell packet scheduler (109) and a first user packet scheduler (107A-M) of the set of user packet schedulers (107A-M) are operable to mutually exchange data for providing resource assignment information and establishing a channel (102) with a first user (101A-N) of the group of users using the resource assignment information.

15 Claims, 8 Drawing Sheets

(56) References Cited

U.S. PATENT DOCUMENTS

| | | | |
|---|---|---|---|
| 9,258,738 B2 | 2/2016 | Haberland | |
| 9,781,728 B2* | 10/2017 | Jeon | H04W 72/082 |
| 2013/0163533 A1 | 6/2013 | Anderson et al. | |
| 2013/0172050 A1* | 7/2013 | Fleming | H04B 7/024 |
| | | | 455/562.1 |
| 2013/0279452 A1* | 10/2013 | Liu | H04W 72/1268 |
| | | | 370/329 |
| 2013/0336270 A1 | 12/2013 | Nagata et al. | |

FOREIGN PATENT DOCUMENTS

| | | |
|---|---|---|
| JP | 2015-504271 A | 2/2015 |
| WO | WO 2012/093687 A1 | 7/2012 |
| WO | WO 2013/072138 A1 | 5/2013 |

OTHER PUBLICATIONS

"3$^{rd}$ Generation Partnership Project; Technical Specification Group Radio Access Network; UTRA overall description (Release)," 3GPP TS 25.401 V11.1.0, pp. 1-63, XP050691127, (Dec. 2012).

Cmcc et al., "Application of BBU+RRU based CoMP system to LTE- Advanced," 3$^{rd}$ Generation Partnership Project (3GPP), 3GPP TSG-RAN1 #55, R1-084612, pp. 1-2, XP050317843, Prague, Czech Republic, Nov. 14, 2008.

International Search Report for PCT/EP2014/059746 dated Jun. 26, 2014.

* cited by examiner

SCHEDULING VIRTUALIZATION FOR MOBILE CLOUD FOR LOW LATENCY BACKHAUL

TECHNICAL FIELD

The disclosure relates to telecommunication systems, and more particularly to a scheduler virtualization for mobile cloud for low latency backhaul.

BACKGROUND

Mobile Cloud radio access network (RAN) environments consist of several cooperating MultiSite MultiStandard baseband units that manage the baseband processing for different clusters of Remote Radio Heads with pooling capability using a centralized scheduling structure.

SUMMARY

Various embodiments provide for an improved baseband assembly, an improved multi-baseband assembly, an improved method and a computer program product as described by the subject matter of the independent claims. Advantageous embodiments are described in the dependent claims.

The term "channel" or "bearer" as used herein refers to an over-the-air, wireless transmission path in a network (such as a RAN) and is used to carry user (e.g. user equipment) data traffic.

The term "user data processor" (UP) as used herein refers to various functions or algorithms to process a complete layered stack of user processing in the related radio access technology.

The term "user" as used herein refers for example to a user equipment or a portable or mobile device capable of wireless communication, a portable or mobile communication device capable of wireless communication, a mobile phone, a cellular phone, a laptop or notebook computer capable of wireless communication, a PDA capable of wireless communication, a handheld device capable of wireless communication, or the like.

The term "HARQ" stands for Hybrid Automatic Repeat Request.

The term "ACK" stands for acknowledgment.

The term "NACK" stands for negative or non-acknowledgment.

The term "CCE" stands for Control Channel Element.

The term "Mu-MIMO" stands for multi-user multiple-input and multiple-output.

The term "DL" stands for downlink.

The term "UL" stands for uplink.

The term "TTI" stands for Transmission Time Interval.

Some embodiments provide a baseband processing assembly for processing signals of at least one remote radio head, the at least one remote radio head serving a radio cell of a cellular communication system, the baseband processing assembly comprising a set of user packet schedulers and a cell packet scheduler, wherein the cell packet scheduler is assigned to the radio cell, wherein the set of user packet schedulers are assigned to a group of users associated to the radio cell, wherein the cell packet scheduler and a first user packet scheduler of the set of user packet schedulers are operable to mutually exchange data for providing resource assignment information and establishing a channel with a first user of the group of users using the resource assignment information.

According to one embodiment, the set of user packet schedulers may be executed on a respective set of processing elements of the baseband processing assembly.

For example, the resource assignment information may be provided and/or used for the established channel.

The set of user packet schedulers are assigned to a group of users associated to the radio cell for serving the group of users. Serving a user comprises serving a channel of the user.

The set of user packet schedulers may be created as instances of same or different user packet schedulers. An instance may be created as soon as a user of the group of users is connected to the remote radio head (RRH).

For example, exchange of control data may be performed between the set of user data packet schedulers and the cell packet scheduler for providing resource assignment information and establishing channels of the group of users using the resource assignment information.

These features may be advantageous as they may prevent multiple interconnections that would otherwise be required in case of a centralized scheduler that is connected to de-centralized user data processor parts. For example, the centralized scheduler may require a high number of interactions to the user data processor parts such as for obtaining scheduling information from the users. These interactions may cause an add-on latency which may violate the HARQ timing requirements where a transmitted packet needs and ACK/NACK at least within 8 ms.

These features may provide a load balancing and/or distributing capability for any central scheduler function among user schedulers within a baseband unit or among base-band units. Such distribution or balancing may allow a parallel or interleaved execution of the distributed schedulers that may speed up the whole scheduling process.

For example, a multi-threading execution of the user schedulers may be provided either on single or multiple processing elements.

Another advantage may be that the present embodiment may provide a scheduling based virtualization which may achieve higher pooling gains due to its finer granularity. This may guarantee a better utilization of the processing elements within a baseband processing assembly.

Another advantage may be that the processing needs in the cell related scheduling part may be minimized which may speed up the overall scheduling process.

These features may allow uplink and downlink radio signals of the radio cell to be simultaneously scheduled on at least one processing element, thereby maximizing utilization of the processing resources and supporting a flexible processing resource allocation strategy.

According to one embodiment, the baseband processing assembly comprises at least a first and second baseband unit, BBU, wherein the first baseband unit comprises the cell packet scheduler and a first subset of the set of user packet schedulers, wherein the second baseband unit comprises a second subset of the set of user packet schedulers, wherein the first baseband unit is serving the radio cell.

The first BBU is serving the radio cell by processing signals of the at least one remote radio head.

This embodiment may be advantageous, as it may provide an off-loading/load balancing capability of processing capability for any scheduler function among processing elements within a single BBU or among BBUs.

Another advantage may be that the BBUs may further be connected together to achieve a higher flexibility in resource pooling and in the capability to shift baseband processing from low traffic areas to high traffic areas. This is in contrast to the conventional methods which consist of multiple radio units tightly coupled to a BBU without pooling capability.

According to one embodiment, the at least first and second baseband unit are linked via an internal low latency link for exchanging data between the second subset of user packet schedulers and the cell packet scheduler.

According to one embodiment, the at least first and second BBU are linked via a low latency backhaul link for exchanging data between the second subset of user packet schedulers and the cell packet scheduler.

These embodiments may be advantageous as they may provide lower transport latency compared to high latency connections.

The term "latency link" refers to a round trip time (RTT) delay in the transmission, over the link, of data from the source of the data and the reception of an acknowledgment at the source.

The term "Low latency" as used herein refers a latency value smaller than a predetermined maximum allowed transport delay within a network (e.g. RAN) of the cellular communication system.

For example, in case of LTE the low latency may be of several hundred μsec depending on the existing base station processing delay. In this example, the link latency may be determined by the 8 ms RTT of the LTE HARQ mechanism with the following condition: link latency=8 ms−UE processing delay−eNodeB processing delay−frame mapping time−air-Interface propagation; wherein a link is considered as a low latency link when the link latency value as defined above is positive.

According to one embodiment, the radio cell is a first radio cell, wherein the second BBU is serving a second radio cell, wherein the first and second radio cell are one of a small cell and macro cell. This embodiment may be advantageous as it may be seamlessly integrated in HetNet system.

According to one embodiment, the baseband processing assembly further comprises a load distributer operable to assign processing tasks of the first user to a user data processor of the first or second BBU.

The processing tasks of the first users refers to the processing tasks involved by a channel or bearer linking the first user to the RRH.

The load distributer is further operable to assign the set of user packet schedulers to the group of users in the first and/or second BBU.

This may be advantageous as it may combine scheduling as well as user processing virtualization. For example, the user related scheduling functions are subject of virtualization as the user processing functions, and may be placed together at the same processing resource elements.

According to one embodiment, the resource assignment information are provided according to at least one radio access technology. This embodiment may be advantageous as it may be seamlessly integrated in existing systems.

According to one embodiment, the first user packet scheduler is operable to:
receive scheduling conditions information for the first user;
process the received scheduling conditions information, thereby determining modulation and coding schemes and antenna selection for data transmission on the channel;
send to the cell scheduler a resource message indicative of the modulation and coding schemes and antenna selection;
receive a response from the cell scheduler indicative of radio resource blocks information for the channel and a confirmation of the determined MCS and antenna selection; wherein the resource assignment information comprises the MCS, antenna selection and the radio resource blocks information.

This may be advantageous as it may provide a coherent resource scheduling and thus a reliable scheduling of resources for the users of the telecommunication cellular system.

According to one embodiment, the first user packet scheduler is further operable to:
determine processing resources required for establishing the channel using the resource assignment information;
send a resource request message to a Local Resource Manager, LRM, of the baseband processing assembly indicative of the determined processing resources;
receive a resource grant message from the LRM.

This may be advantageous as it may provide a defense mechanism to protect against processing overload.

According to one embodiment, the cell packet scheduler is operable to:
receive an allocation priority of each user of the group of users from a respective assigned user packet scheduler of the set of user packet schedulers;
sort the group of users by the allocation priority;
in response to a determination that available radio resources are not sufficient for the group of users, selecting a subgroup of users of the group of users having lowest allocation priority and perform one of:
excluding users of the subgroup;
modifying the modulation and coding schemes for the subgroup of users;
modifying the antenna selection for the subgroup of users.

According to one embodiment, in case the channel is a downlink channel, the received scheduling conditions information comprises a channel state information, CSI, including a channel quality indicator, CQI, of the first user, a negative acknowledgement, NACK, indicator in case of needed retransmission, and precoding matrix indicator, PMI; rank indicator for the channel, Quality of Experience, QoE, metrics comprising each a performance characteristic for the channel; and an Radio Link Control, RLC, buffer size of the channel.

According to one embodiment, in case the channel is an uplink channel, the received scheduling information comprises a CSI including a CQI of the first user, PMI, rank indicator for the first channel, and NACK indicator in case of needed retransmission, scheduling request for at least one uplink component carrier, and a buffer status report of the first user.

Various embodiments relate to a multi-baseband processing assembly system comprising a first baseband assembly and a second baseband assembly according to previous embodiments, wherein the first baseband assembly and second baseband assembly are linked via a low latency backhaul link to exchange data between the second set of user packet schedulers of the second baseband assembly and the cell packet scheduler of the first baseband assembly for assigning resources for a group of users corresponding to a first radio cell served by the first baseband processing assembly using data exchanged between the first set of user packet schedulers of the second baseband assembly and the first cell packet scheduler.

The group of users may be assigned to both first and second set of user packet schedulers and thus they get assigned resources using exchanged data between the second set of user packet schedulers and the cell packet scheduler and exchanged data between the first set of user packet schedulers and the cell packet scheduler.

Various embodiments relate to a method for processing signals of at least one remote radio head in a baseband processing assembly, the at least one remote radio head serving a radio cell of a cellular communication system, the baseband processing assembly comprising a set of user packet schedulers and a cell packet scheduler, wherein the cell packet scheduler is assigned to the radio cell, wherein the set of user packet schedulers are assigned to a group of users associated to the radio cell, the method comprising exchanging data between the cell packet scheduler and the first user packet scheduler; providing resource assignment information and establishing a channel with the first user of the group of users using the resource assignment information.

Various embodiments relate to a computer program product comprising computer executable instructions to perform the method steps of the method of the preceding embodiment.

It is understood that one or more of the aforementioned embodiments may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

The present disclosure describes a distributed scheduling architecture for the Mobile Cloud based on a virtualization concept on a scheduler basis. The method may consist of a split of the scheduler into the user and cell related functions, where the user related scheduling functions are subject of virtualization as well as the user processing functions and placed to the same processing resources.

Figure 1:
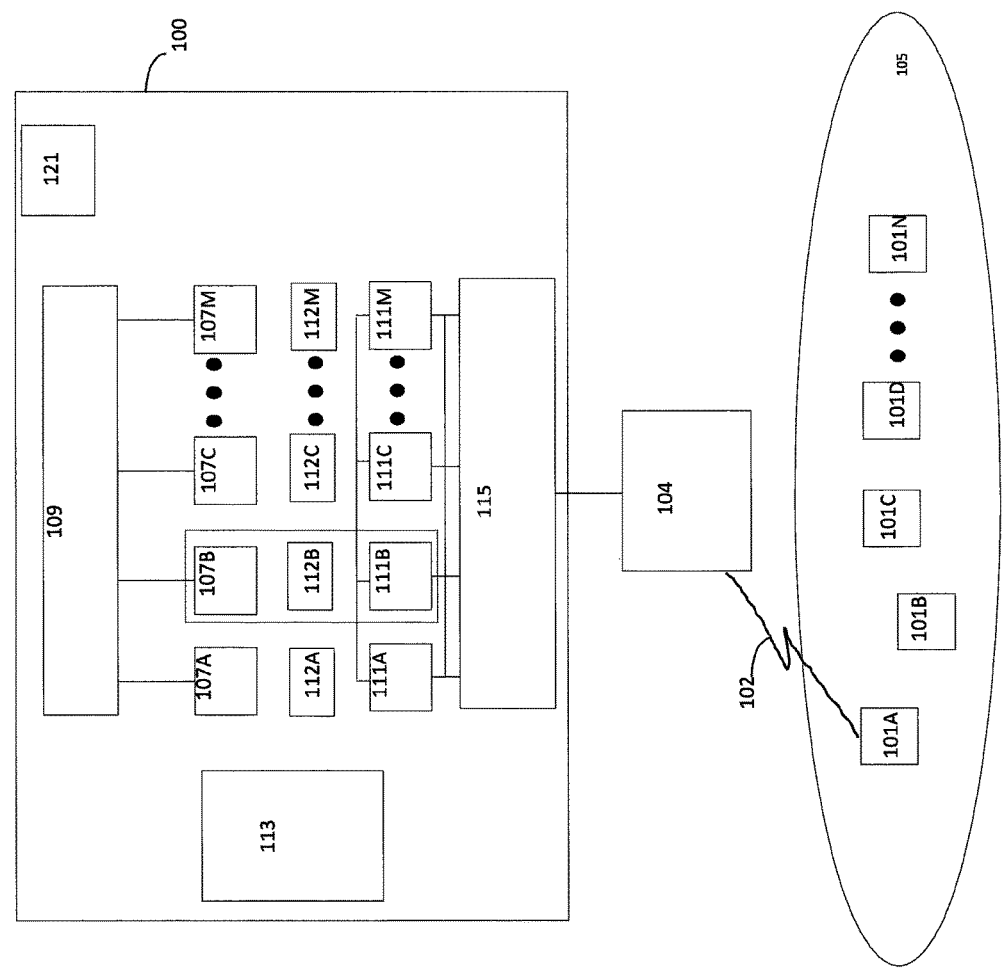
FIG. 1 schematically shows a functional block diagram of a first exemplary baseband processing assembly, FIG. 2 schematically shows a functional block diagram of a second exemplary baseband processing assembly, FIG. 3 schematically shows a functional block diagram of a third exemplary baseband processing assembly.

FIG. 1 schematically shows a functional block diagram of a first exemplary baseband processing assembly 100. The baseband processing assembly 100 may be connected to at least one remote radio head (RRH) 104. The at least one RRH 104 serves a radio cell 105 of a cellular communication system, such as an UMTS or LTE system or a combination thereof. The at least one RRH 104 may provide the transmitter (Tx), Power Amplifier (PA), receiver (Rx) and antenna functions. The at least one RRH 104 and the baseband processing assembly 100 are spatially separated with high-speed optical links (low latency links). The RRH 104 may have different output power levels to serve different sized cells such as Macro-, Pico- and Femto-cells and may be installed in indoor- and/or outdoor environments. In the in outdoor Marco-cell scenario the respective RRHs 104 may be driven with relatively high power, whereas in an indoor scenario the respective RRHs 104 may be driven with comparatively low electric power.

The radio cell 105 comprises a group of users 101A-N. The baseband processing assembly 100 may serve for processing baseband or bearer signals of the at least one remote RRH 104. Such signals are transmitted through channels dedicated to the group of users 101A-N.

The baseband processing assembly 100 may further comprise a set of user packet schedulers 107A-M and a cell packet scheduler 109. The cell packet scheduler 109 may be assigned to the radio cell 105 in the sense that it may schedule or assign resources of the radio cell 105. The set of user packet schedulers 107A-M are assigned to the group of users 101A-N for serving them. For example, each user packet scheduler may serve a respective user of the group of users 101A-N. For example, the user packet scheduler 107B may serve the user 101A. For example, the user packet scheduler 107B may schedule user related resources to at least one channel 102 linking the user 101A to the RRH 104. The channel 102 may carry data between the user 101A and the RRH 104. In this way, the scheduling virtualization may be realized where a user (or channel of the user) may be assigned to a user packet scheduler of the set of user packet schedulers 107A-M.

The cell packet scheduler 109 and the user packet scheduler 107B may mutually exchange data for jointly providing resource assignment information and establishing the channel 102 with the user 101A using the resource assignment information. The resource assignment information may comprise MCS and antenna selection and radio resource blocks information for data transmission on the channel 102.

For simplicity of the description, only one channel is described; however, the skilled in the art will easily understand that the present method may be generalized to more than one channel per user or group of users.

The baseband processing assembly 100 may further comprise a set of user data processors 111A-M. A user data processor of the set of user data processors 111A-M may comprise a user processor transmitter (UPTx) and a user processor receiver (UPRx) functions from S1 termination up to PHYuser. A user data processor of the set of user data processors 111A-M may be assigned to a user of the group of users 101A-N. For example, the user data processor 111B may be assigned to the user 101A to process, for example, baseband or bearer data transmitted on the channel 102.

The baseband processing assembly 100 may further comprise a set of processing elements 112A-M to execute for example baseband signal processing (UPTx, UPRx) and scheduling functions as defined by the user packets schedulers 107A-M.

The assignment of the user data processors as well as the set of user and cell packet schedulers to the users 101A-N may be performed by a load distributer 113 of the baseband processing assembly 100. For example, the load distributer 113 may assign the user packet scheduler 107B together with the user data processor 111B to the channel 102 of the user 101A. The functions of the user pack scheduler 107B together with the user data processor 111B may be allocated to the processing element 112B.

Alternatively or in addition the load distributer 113 may assign a user packet scheduler of the set of user packet schedulers 107A-M together with more than one user data processor of the set of user data processors 111A-M to a user of the group of users 101A-N. This may be the case of a user associated with more than one bearers or channels, where the channels may share same feedback information that may be used by a single user packet scheduler for scheduling resources for the one nor more channels. However, each channel may require an associated user data processor.

For example, the load distributer 113 may assign the set of user packet schedulers 107A-M to the group of users 101A-N by creating the set of user packet schedulers as instances of same or different user packet schedulers. An instance may be created as soon as a user of the group of users is connected to the RRH 104.

Each of the set of user data processors 111A-M may be regarded as an entity for performing user plane protocol stack processing and/or dedicated control plane protocol stack processing of the respective user specific data. This protocol stack processing is to be separated from cell physical layer (PHY) radio frame processing, wherein user (or channel) specific data is either adapted to a radio frame structure (downlink), or a radio frame structure is decomposed to the plurality of user (or channel) specific data packets or streams (uplink). As an interface between the aforementioned protocol stack processing and PHY cell radio frame processing of the baseband processing assembly 100 may further comprise a cell physical layer processor 115 for processing a baseband radio frame structure of a radio frame to or from a radio transceiver of the at least one remote radio head 104 serving the radio cell 105. The cell physical layer processor 115 may be operable to perform one or more processing steps of the group of baseband to-transmission band conversion, transmission band-to-baseband conversion, de-multiplexing, multiplexing, Fast Fourier Transform (FFT), Inverse Fast Fourier Transform (IFFT), Cyclic Prefix Insertion (CPI), Cyclic. Prefix Removal (CPR), spreading, de-spreading, etc.

The cell physical layer processor 115 may comprise a framer (de-framer) for (de-) composing or (de-) multiplexing radio frame structures.

The baseband processing assembly 100 may comprise more than one cell physical layer processor associated to different radio access technologies such as LTE and UMTS. In this case, part of the set of user packet schedulers 107A-M may be assigned to a given radio access technology e.g. LTE and the other part to e.g. UMTS. Thus, the baseband processing assembly 100 may also be referred to as Multi site/standard Baseband Units (MSS-BBU).

The baseband processing assembly 100 may further comprise a LRM 121 for managing resources of the baseband processing assembly 100 to the set of user packet schedulers 107A-M. For example, the LRM 121 may comprise the functions of the load distributer 113.

The baseband processing assembly 100 may be for example a BBU, wherein the BBU may be regarded as a hardware module in form of a Digital Signal Processor (DSP) General Purpose Processor (GPP) and/or any hardware accelerator as a Printed Circuit Board (PCB), for example. The processing elements 112A-M may comprise at least one of the GPP, the DSP and the PCB.

Figure 2:
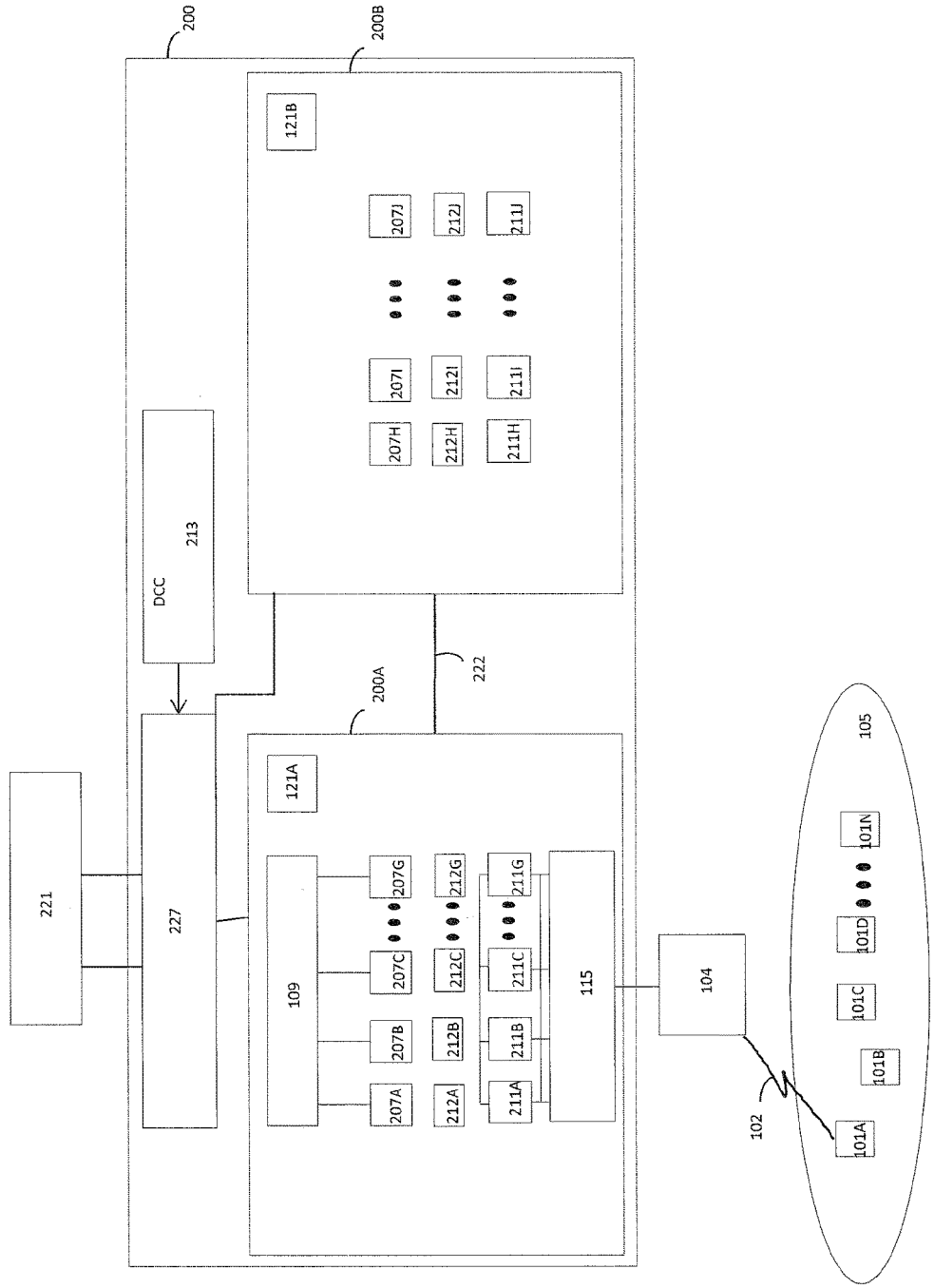

FIG. 2 schematically shows a functional block diagram of a second exemplary baseband processing assembly 200. The baseband processing assembly 200 may comprise a home and remote BBU 200A and 200B. The home and remote BBU 200A and 200B may have the same structure as the baseband processing assembly 100 described with reference to FIG. 1. The home BBU 200A may be spatially collocated with the remote BBU 200B and connected to each other via an internal low latency link 222. The internal low latency link 222 may, for example, be a rapid serial link or a fast Peripheral Component Interconnect (PCI) bus.

The home BBU 200A may comprise the cell packet scheduler 109 and a first set 207A-G of user packet schedulers. The remote BBU 200B may comprise a second set 207H-J of user packet schedulers.

The home BBU 200A is operable to process signals of the at least one RRH 104. The at least one RRH 104 may serve the radio cell 105. The home BBU 200A may further comprise a first set of user data processors 211A-G. The remote BBU 200B may further comprise a second set of user data processors 211H-J.

The home BBU 200A may further comprise a first set of processing elements 212A-G. The remote BBU 200B may further comprise a second set of processing elements 212H-J.

The baseband processing assembly 200 may further comprise a load distributer 213. The load distributer 213 may assign user data processors as well as user schedulers of the home BBU 200A and/or the remote BBU 200B to the users 101A-N. For example, the load distributer 213 may assign the user packet scheduler 207B together with the user data processor 211B of the home BBU 200A to the channel 102 of the user 101A. Alternatively, the load distributer 213 may assign the user pack scheduler 207H together with the user data processor 211H of the remote BBU 200B to the channel 102 of the user 101A. This may be motivated by the fact that the remote BBU 200B may have more available processing elements than the home BBU 200A.

With the second exemplary assembly 200, the scheduling virtualization may be realized where a user (or channel of the user) may be served by a user packet scheduler of one of the BBUs 200A and 200B. The scheduling virtualization may be combined with user processing tasks virtualization by performing a combined assignment of the user packet schedulers and the user data processors to the users.

The load distributer 213 may also assign the functions of the first set of user packet schedulers 207A-G and the first set of user data processors 211A-G to the processing elements 212A-G of the home BBU 200A. The load distributer 213 may also assign the functions of the second set of user packet schedulers 207H-J and the second set of user data processors 211H-J to the processing elements 212H-J of the remote BBU 200B.

The load distributer 213 may also be regarded as decentralized cloud controller (DCC), which may be used in scheduling distribution in the cloud of user packet schedulers and in addition for load balancing and processing capacity distribution in the cloud of the user data processors.

The baseband processing assembly 200 may be connected to a Radio Network Controller (RNC), a Mobility Management Entity (MME) and a Serving Gateway (SGW) 221 via a Router/Address Dispatcher 227. The router/address dispatcher entity 227 may route the S1-U, S1-MME and Iub user or bearer specific packets in a direct way to the BBUs 200A and 200B according to load distribution.

Figure 3:
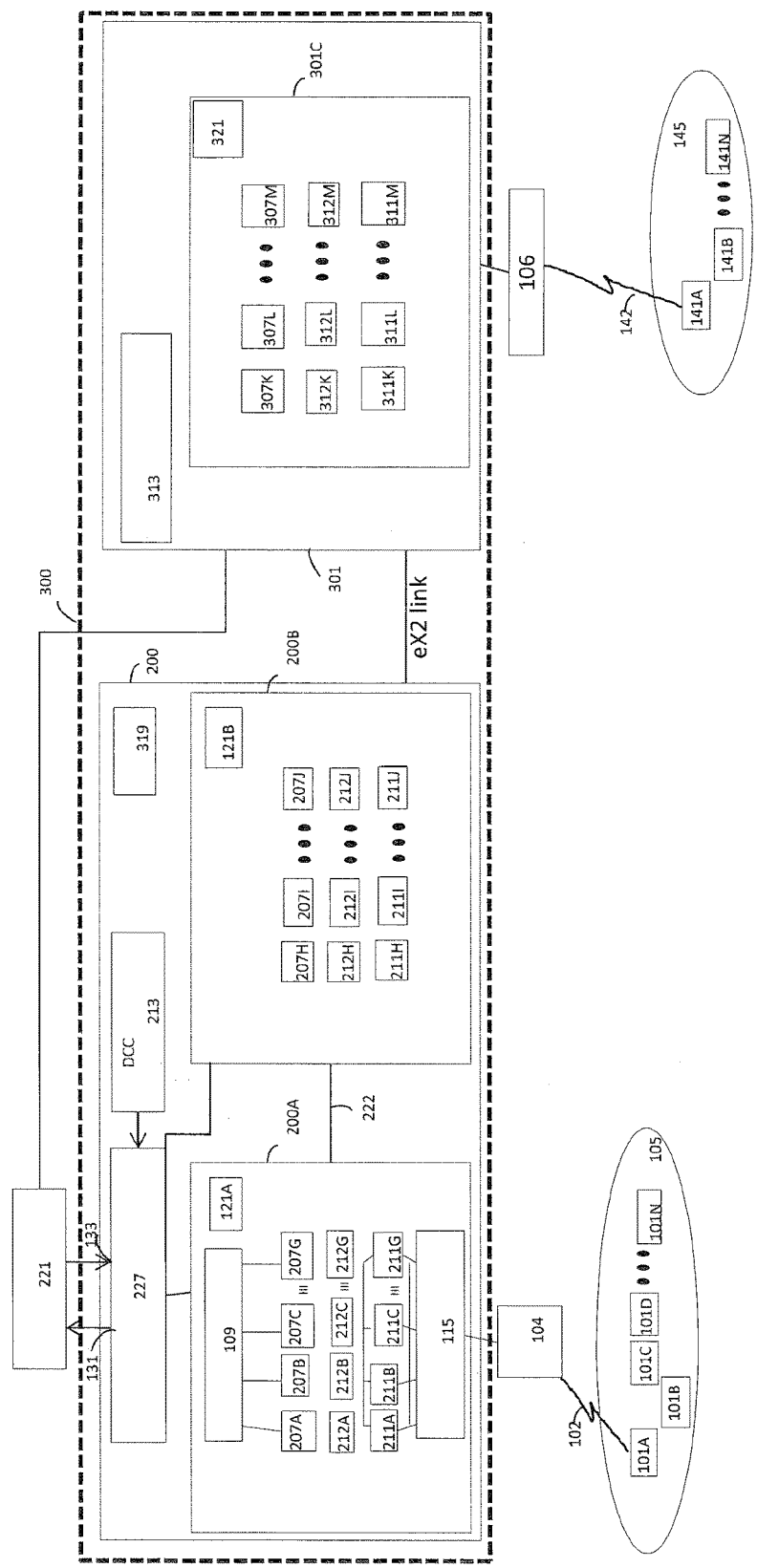

FIG. 3 schematically shows a functional block diagram of a third exemplary baseband processing assembly 300. The baseband processing assembly 300 may comprise the baseband assembly 200 that is connected to a remote baseband processing assembly 301. The remote baseband processing assembly 301 is similar to the baseband assembly 200. The remote baseband processing assembly 301 comprises a remote BBU 301C.

The remote BBU 301C may comprise a third set 207K-M of user packet schedulers. The remote BBU 301C may further comprise a third set of user data processors 211K-M. The remote BBU 301C may further comprise a third set of processor elements 212K-M.

The baseband processing assembly 200 may comprise an interface 319 to connect the baseband processing assembly 200 to the remote baseband processing assembly 301. The interface 319 may, for example, be an inter-base station interface, such as an enhanced X2 interface to be defined by 3GPP. The baseband processing assembly 200 may then be physically connected to the baseband processing assembly 200 via an enhanced X2 link. The enhanced X2 link may be a low latency link. The latency of the enhance X2 (eX2) link may be measured during initialization phase and refined during the operation modus. The estimated latency may be within the range of the allowed transport latency-measured fronthaul latency measured during the initialization phase.

The load distributer 213 may assign user data processors as well as user schedulers of the home BBU 201A-201B and/or the remote BBU 301C to the users 101A-N. For example, the load distributer 213 may assign the user packet scheduler 207B together with the user data processor 211B of the home BBU 201A to the channel 102 of the user 101A. Alternatively, the load distributer 213 may assign the user pack scheduler 207G together with the user data processor 211G of the remote BBU 201B to the channel 102 of the user 101A. Alternatively, the load distributer 213 may assign the user pack scheduler 207K together with the user data processor 211K of the remote BBU 301C to the channel 102 of the user 101A. In this way, the load distributer 213 may distribute resources based on a virtual concept, where the user packet schedulers 207A-M may be regarded as virtual entities, in which dedicated user scheduling for UL as well as DL takes place.

The load distributer 213 may also assign the functions of the third set of user packet schedulers 307K-M and the third set of user data processors 311K-M to the processing elements 312K-M of the remote BBU 301C.

In case a radio cell 145 served by the BBU 301C is a pico cell e.g. all-in-one Metro cell comprising users 141A-141N, the BBUs 200A and 200B may be seen by users 141A-141N as remote BBUs serving the macro cell 105 and the BBU 301C may be seen as home BBU by the users 141-A-N. This architecture may then represent a HetNet system. For the HetNet, part of the traffic in the home BBU 301C may be offloaded to the remote BBUs 200A and 200B. The baseband processing assembly 200 may act as a relay for the S1 data of the non-offloaded user packet schedulers 207A-J. The PHYcell entity 115 for LTE may comprise a framer for multiplexing radio frame structures (of e.g. S1 data signals) with the user data processor to/from PHYcell signals of the remote BBU 100A. In this case, the home BBU 301C may include the RRH 106 (like the RRH 104), signals of which are processed by the home BBU 301C.

Figure 4:
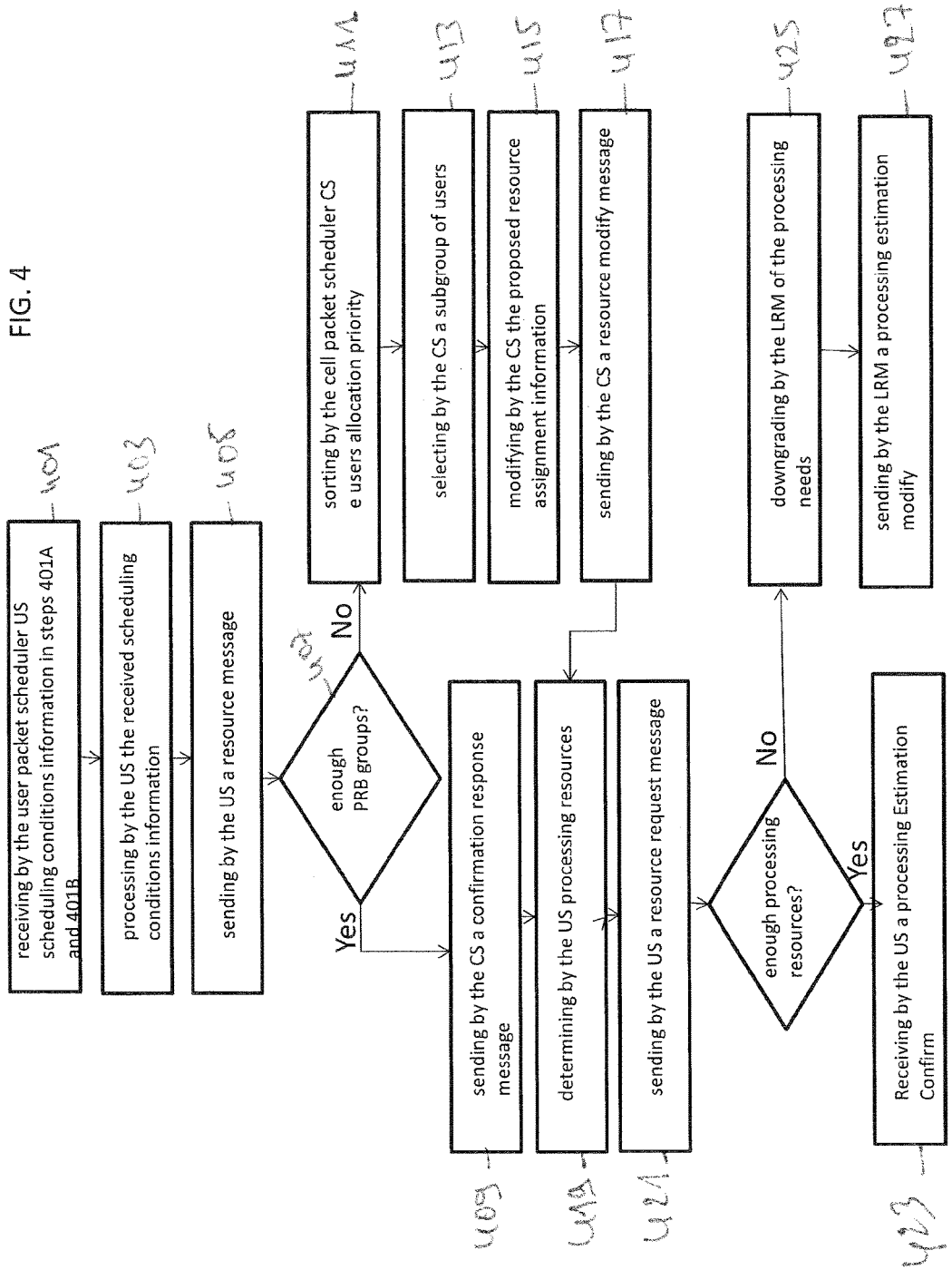
FIG. 4 is a flowchart for a method for scheduling downlink data.

FIG. 4 shows a flowchart for a method for scheduling downlink data e.g. for the channel 102. The scheduling is jointly coordinated and provided between a user packet scheduler (e.g. 207B) and the cell packet scheduler 109. The user packet scheduler may, for example, be in a remote BBU while the cell packet scheduler is in a home BBU. Alternatively, the user packet scheduler and the cell packet scheduler may be in the same BBU.

For simplicity of the description the scheduling coordination is described in the following between the user packet scheduler 207B and the cell packet scheduler 109. However, such scheduling coordination is also applied between each of the assigned user packet schedulers to the users and the cell packet scheduler.

The user packet scheduler 207B may receive scheduling conditions information in step 401 for the user 101A. For example, during setup of the channel 102, the user packet scheduler 207B may receive, in step 401A from the LRM 121A associated with the user packet scheduler 207B QCI for the channel 102. The QCI may comprise for example an authorized minimum bitrate required for achieving the Quality of Service Level of services in case the channel 102A is a GBR channel. The QCI may further comprise a maximum packet error rate required for achieving the Quality of Service Level of services in case the channel 102A is a GBR or NGBR channel. The QCI may further comprise a maximum end to end packet delay from where the allowed RAN latency can be derived. In step 401B, the user packet scheduler 207B may receive from the user processing unit 211B channel state information, CSI, including a channel quality indicator, CQI, PMI and rank indicator for the channel 102. The user packet scheduler 207B may further receive a NACK, indicator from the user 101A via the user processor unit 211B in case of needed retransmission. The user packet scheduler 107B may further receive from the user data processor 211B QoE, metrics comprising a performance characteristic for the channel 102 according to QCI definitions. A QoE metric may comprise for example, an allowed deviation threshold in transmission or reception bitrates. Further, the user packet scheduler 207B may receive from the user data processor 211B used RLC buffer size of the RLC buffer of the user data processor 211B.

For example, the RAN latency may refer to the time it takes for a packet of data to travel from a source e.g. starting from the link interaction point 131 (FIG. 3) to the destination plus the time it takes to receive from the destination a reception acknowledgement of the packet of data at the source e.g. arriving at the link point 133 (FIG. 3).

In step 403, the user packet scheduler 207B may process the received scheduling conditions information, for example, to obtain a user priority of the user 101A. The user priority may be obtained by comparing for example the current packet delay with the requested delay (indicated by the received QCI) and/or comparing the current bitrate with the minimum authorized bitrate. These comparisons may result in one or more deviation values relative to the requested or recommended values (e.g. as determined by the QoE), and the large the deviation is the high priority is assigned to the user 101A. The processing may also comprise the calculation of the Proportional Fair (PF) weights using CQI frequency response to support frequency selective scheduling. The user packet scheduler 207B may then use said processing results to determine modulation and coding schemes using the CQI and antenna selection for data transmission on the channel 102 using the PMI and the RI.

In step 405, the user packet scheduler 207B may send to the cell packet scheduler 109 a resource message indicative of the modulation and coding schemes and antenna selection; as well as the used RLC buffer size of the user data processor 211B. The resource message may also indicate an allocation priority of the user 101A and a CSI and HARQ retransmission indicator (only if retransmission is needed) of the channel 102.

In step 407, depending on available resources of the radio cell 103, the cell packet scheduler 109 may allocate physical resource blocks (PRB) for the channel 102 of the user 101A as well as for the rest of users 101B-101N for which the cell packet scheduler 109 received scheduling conditions information from associated user packet schedulers.

The entities within a home and a remote BBU may be synchronized in time domain. A synchronization mechanism may be implemented, that allows a synchronous start of the Scheduler parts on user (user packet schedulers) and cell level (cell packet scheduler), where the reference may be the timing of the cell signals (where TTI starts) of the cell packet scheduler.

For example, in case, there are enough PRB groups for all users 101A-N, the cell packet scheduler 109 returns, in step 409, a response message to the respective user packet schedulers e.g. to 207B from which the cell packet scheduler 109 received resource information. The response message may indicate a confirmation of the received MCS and antenna selection as an acceptance of the proposal from the user schedulers. The message may further indicate the PRB allocation for the channel 102 and a CCE allocation to be applied for the PDCCH which is used to indicate to the user 101A where it can find its scheduled data.

The expression "Enough PRB groups" refer to the minimum number of PRBs in time and frequency domains that fulfill CQI requirements and MCS and antenna selection requirements.

However, in case there are not enough PRB groups for all users 101A-N, the cell packet scheduler 109 may sort the users 101A-N by the allocation priority in step 411, and may select a subgroup of users of the users 101A-N to be excluded or downgraded having the lowest priority in step 413. Next, in step 415, the cell packet scheduler 109 may perform one of: excluding users of the subgroup such that no scheduling neither processing of their data is to be performed; reducing the PRB usage and adapting the MCS for the subgroup of users; and modifying the antenna selection to achieve a lower PRB usage for lower priority users. For example, the cell packet scheduler 109 may exclude the users having the lowest allocation priority until the PRBs are enough and the QoS is not yet affected.

In step 417, the cell packet scheduler 109 may send modification of resources message to the user packet scheduler indicative of the modified resources.

As soon as the user packet scheduler 207B receives, the response message concerning resources from the cell packet scheduler 109, the user packet scheduler 207B may determine in step 419 processing resources required for establishing the channel 102 using the resource assignment information, and send in step 421 a UP processing effort estimation to the LRM 121A of the baseband band unit 201A indicative of the needed processing resources to check if there is enough processing capacity.

In addition an indication of the reduced processing effort need corresponding to a parameter set, where the QoE parameters (e.g. guaranteed bit rate and latency) are just met and an indication, if the data radio bearer carries a GBR or NGBR application is send by the user schedulers to the LRM.

That is, verifying that the determined resources or the resources to be allocated are fulfilling at least part of the QoE metrics. In case of enough processing capacity after receiving the needed processing capacity from all user packet schedulers, the LRM 121A accepts the proposal sending back in step 423 a processing estimation confirmation message to the user packet scheduler 207B.

In case of not enough processing capacity the LRM 121A triggers in step 425 a downgrade of the processing needs while satisfying a QoE and GBR/NGBR awareness and sends in step 427 back a processing estimation modify message to the user packet scheduler 207B. The processing estimation modify message indicates a modification of the processing resources determined (or estimated) by the user packet scheduler 207B.

After receiving the feedback from their associated LRM the User Schedulers are starting a MCS and antenna mapping refinement matched to the allocated processing capacity (e.g. PRBs). After this refinement the user packet schedulers are forwarding the final MCS, Antenna mapping, PRB and CCE allocation to the associated user data processors and the DL scheduling processing can continue as described with reference to FIG. 5.

The steps 401B-427 may be repeated in a periodic basis during an operational scheduling phase per TTI where the RLC buffer shows data in the buffer for the user 101A; wherein the scheduling conditions information are also periodically received from the user 101A during the operation scheduling phase.

Figure 5:
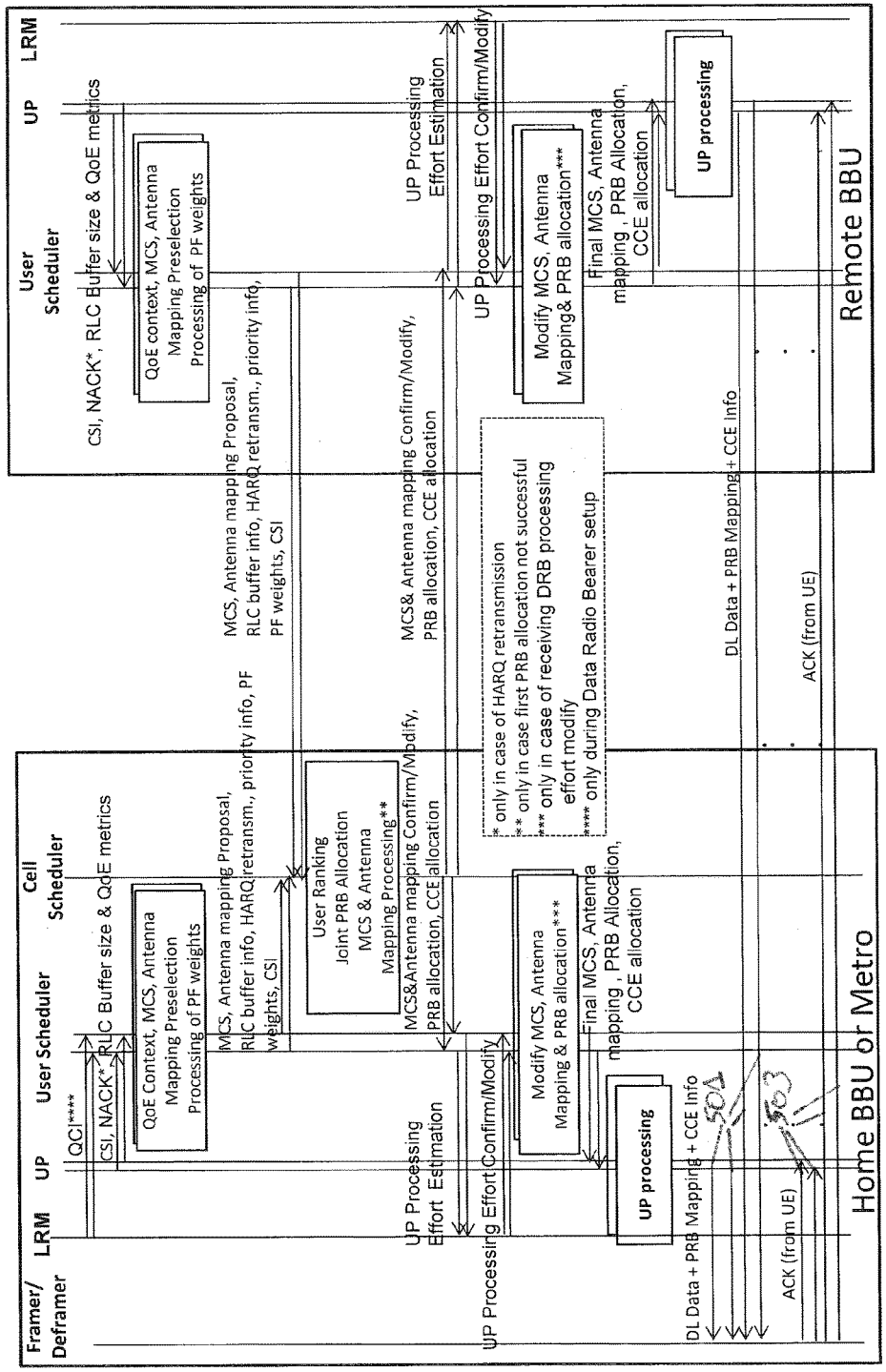
FIG. 5 shows a DL scheduling process with a message sequence chart.

In FIG. 5 a home BBU and a remote BBU connected via a low latency link are schematically shown. In this example 2 UPs are placed at the home BBU and 2 UPs are placed at the remote BBU. In the general case this may also be an interaction between one home BBU and several remote BBUs each connected via a low latency link to the home BBU.

The preparation and coordination phase (for providing the final MCS, antenna mapping and PRBs) of this scheduler process is already described with reference to FIG. 4 and may be applied between each of the 4 UPs and the cell packet scheduler.

After receiving the final MCS, antenna Mapping, PRB- and CCE allocation the UPs are starting the processing of the DL data, which may be then delivered with an inband information of the PRB and CCE allocation to the framer of the cell physical layer processor 115 (step 501). Using received data from home BBU and remote BBU the framer of the cell physical layer processor 115 may be able to generate the PDSCH and the PDCCH and send them to the user. This procedure can be done for up to 8 HARQ processes for each user of the users 101A-N.

After latest 8 ms an ACK/NACK is expected from the user (step 503). In case of a NACK, the user data processor may enable a retransmission for the affected HARQ process and the scheduling process starts from the beginning of step 401B.

Figure 6:
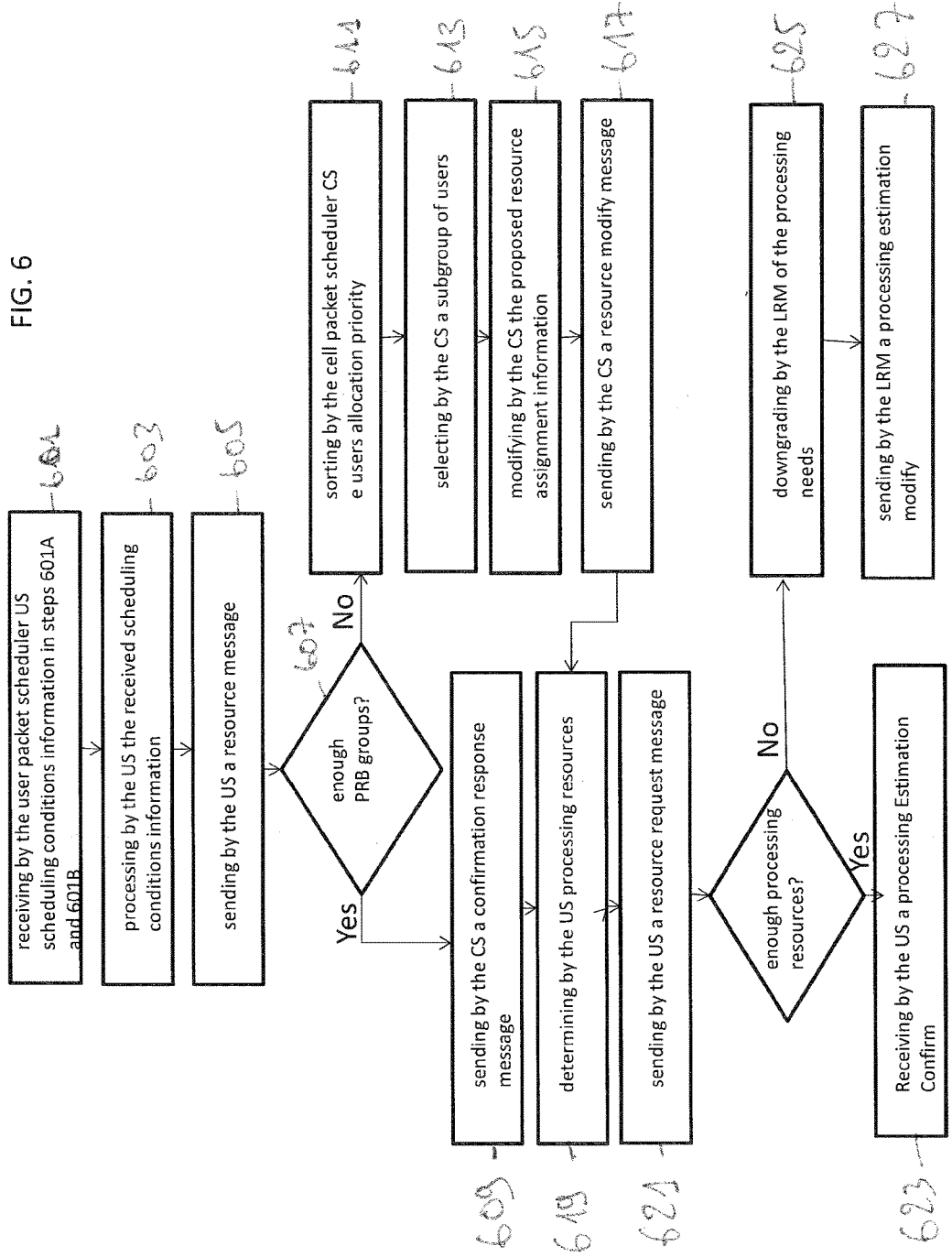
FIG. 6 is a flowchart for a method for scheduling uplink data.

FIG. 6 shows a flowchart for a method for scheduling uplink data e.g. for the channel 102. The scheduling is jointly coordinated and provided between a user packet scheduler (e.g. 207B) and the cell packet scheduler 109. The user packet scheduler may be for example in a remote BBU while the cell packet scheduler is in a home BBU. Alternatively, the user packet scheduler and the cell packet scheduler may be in the same home BBU.

For simplicity of the description the scheduling coordination is described in the following between the user packet scheduler 207B and the cell packet scheduler 109. However, such scheduling coordination is also applied between each of the assigned user packet schedulers to the users and the cell scheduler.

The user packet scheduler 207B may receive scheduling conditions information in step 601 for the user 101A. For example, during setup of the channel 102, the user packet scheduler 207B may receive, in step 601A from the LRM 121A associated with the user packet scheduler 207B QCI for the channel 102. During initial scheduling phase, the user packet scheduler 207B may, in step 601B, receive a scheduling request from the user 101A via the user data processor 211B. The user data packet scheduler 207B may further receive from the user data processor 211B channel state information, CSI, including a channel quality indicator, CQI, PMI and rank indicator for the channel 102. The user packet scheduler 207B may further receive a negative acknowledgement, NACK, indicator from the user processor unit 211B in case of needed retransmission by the user 101A. The user packet scheduler 207B may further receive from the user data processor 211B QoE, metrics comprising each a performance characteristic for the channel 102. Further, the user packet scheduler 207B may receive from the user data processor 211B, the UE Buffer status during operational scheduling phase.

In step 603, the user packet scheduler 207B may process the received scheduling conditions information. The processing may comprise for example determining whether the received QCI fulfill QoE metrics requirements using information from SR and UE buffer status. The processing may also comprise the calculation of the PF weights with CQI frequency response to support frequency selective scheduling. The user packet scheduler 207B may then use said processing results to determine modulation and coding schemes using the CQI and antenna selection for data transmission on the channel 102 using the PMI and the RI.

The steps 605-627 are the same as steps 405-427 respectively.

The steps 601B-627 are repeated in a period basis as long as the user (e.g. 101A) is in the operational scheduling phase, as long it shows data in the buffer for this channel 102.

Figure 7:
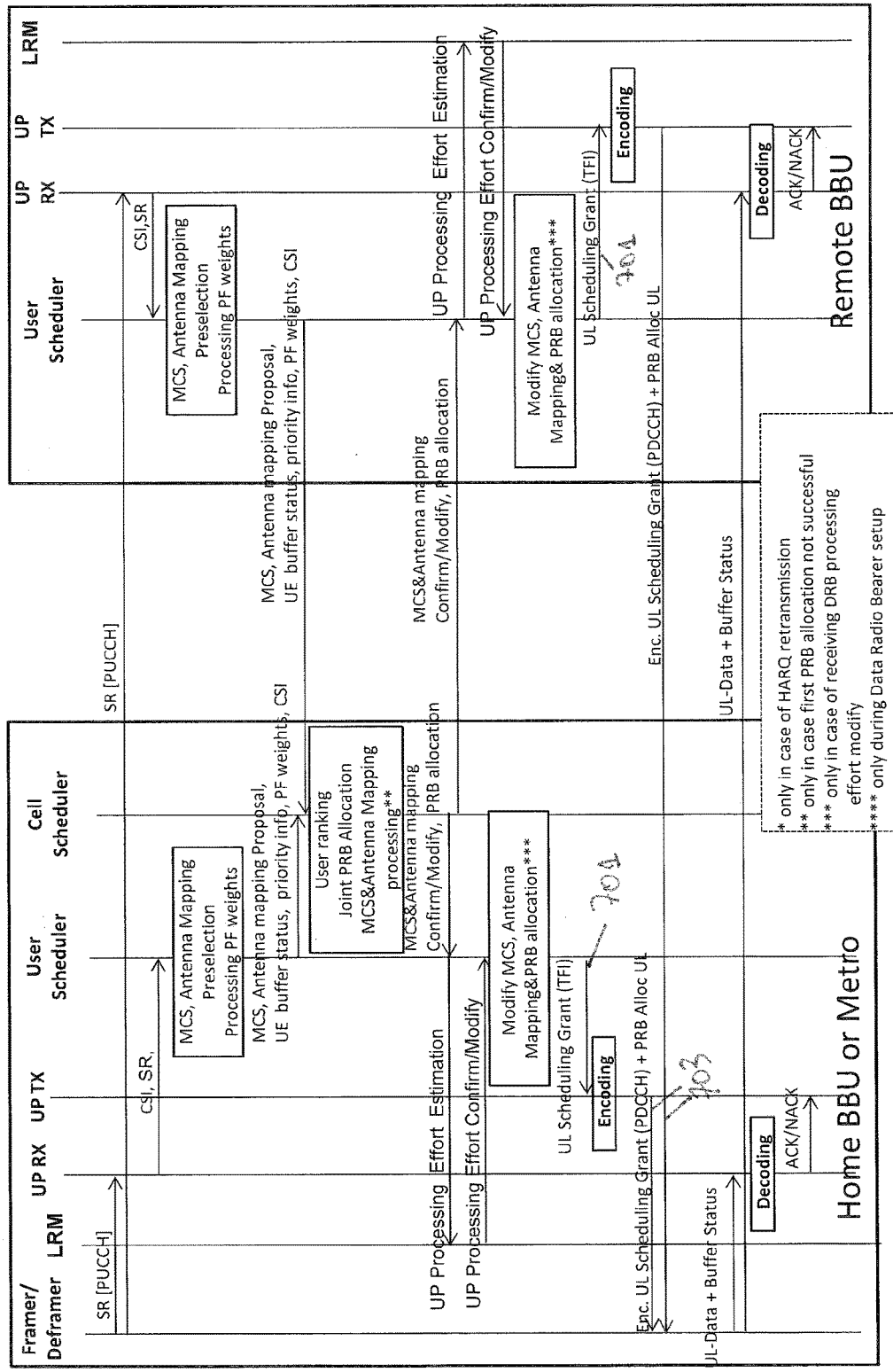
FIG. 7 shows a first example of a UL scheduling process with a message sequence chart.

In FIG. 7 an interaction between a home BBU and a remote BBU linked via a low latency link is shown. In this example 1 UP is placed at the home BBU and 1 UP is placed at the remote BBU. In the general case this could be also an interaction between one home BBU and several remote BBUs each linked via a low latency link with the home BBU.

As in the Downlink case the user packet schedulers are receiving a QCI value (not shown) from the corresponding LRM during the data radio bearer setup.

The UL Scheduling initial process starts with the reception of a SR from the user at the UPRx from the Deframer of the cell physical layer processor 115, which is forwarded to the corresponding user packet scheduler. The preparation and coordination phase of this scheduler process is already described with reference to FIG. 6, where an initial scheduling phase is indicated.

After receiving an UL scheduling grant (step 701) including the final MCS, Antenna Mapping and PRB allocation the UPTx parts are processing the Encoded UL Scheduling Grant for the PDCCH, which will be then delivered to the framer. With all these signals from home BBU and remote BBU the framer is able to generate the DPCCH and send it to the UE (703). This procedure may be done for the 8 HARQ processes for each UE.

Figure 8:
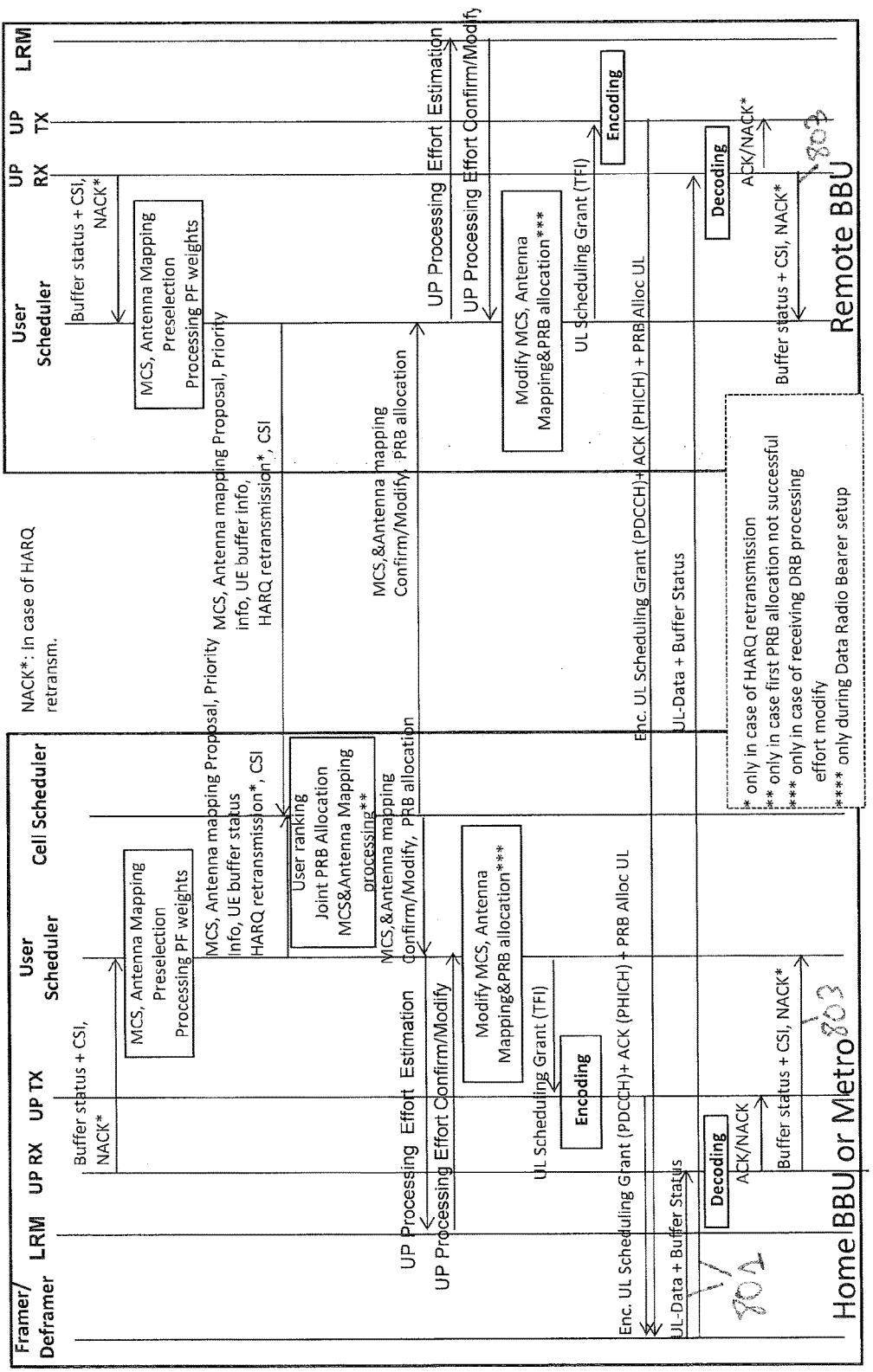
FIG. 8 shows a second example of a UL scheduling process with a message sequence chart.

In FIG. 8, is described the operational phase after latest 8 ms the UL data and a Buffer Status are expected from the UE and forwarded from the Deframer to the UPRx (801), which delivers then the UE buffer status to the user packet scheduler (step 803) and a ACK or NACK to the UPTx. In case of a NACK a retransmission will be triggered. The user packet scheduler starts the same scheduling coordination process as described before (e.g. with reference to FIG. 6 except the QCI reception) also during this operational phase.

The UPTx sends an ACK/NACK and again Encoded UL Scheduling Grant via the framer to the UE. The Scheduling Grant will be inserted in the DPCCH and the ACK/NACK in the PHICH by the framer. This procedure goes on as long as the UE is in the operational scheduling phase, as long it shows data in the buffer for this Data Radio Bearer (DRB).

LIST OF REFERENCE NUMERALS 100 baseband processing assembly
101 user
102 channel
104 RRH
105 cell
106 RRH
107, 207, 307 user packet scheduler
109 cell packet scheduler
111, 211, 311 user data processors
112, 212, 312 processing elements
113 load distributer
115 physical cell layer processor
121 LRM
141 user
142 channel
200, 300 baseband processing assembly
200A-B BBU
213 load distributer, DCC
221 MME
222 link
227 router
301 baseband processing assembly
301C BBU
313 load distributer
319 interface.

The invention claimed is:

1. A baseband processing assembly comprising a hardware apparatus for processing signals of at least one remote radio head, the at least one remote radio head serving a radio cell of a cellular communication system, the baseband processing assembly comprising a set of user packet schedulers and a cell packet scheduler, wherein the cell packet scheduler is assigned to the radio cell, wherein the set of user packet schedulers are assigned to a group of users associated to the radio cell, wherein the cell packet scheduler and a first user packet scheduler of the set of user packet schedulers are operable to mutually exchange data for providing resource assignment information and establishing a channel with a first user of the group of users using the resource assignment information.

2. The baseband processing assembly of claim 1, wherein the baseband processing assembly comprises at least a first and second baseband unit (BBU), wherein the first BBU comprises the cell packet scheduler and a first subset of the set of user packet schedulers, wherein the second BBU comprises a second subset of the set of user packet schedulers, wherein the first BBU is serving the radio cell.

3. The baseband processing assembly of claim 2, wherein the at least first and second BBU are linked via an internal low latency link for exchanging data between the second subset of user packet schedulers and the cell packet scheduler.

4. The baseband processing assembly of claim 2, wherein the at least first and second BBU are linked via a low latency backhaul link for exchanging data between the second subset of user packet schedulers and the cell packet scheduler.

5. The baseband processing assembly of claim 2, wherein the radio cell is a first radio cell, wherein the second BBU is serving a second radio cell, wherein the first and second radio cell are one of a small cell and macro cell.

6. The baseband processing assembly of claim 2, further comprising a load distributer operable to assign processing tasks of the first user to a user data processor of the first and/or second BBU.

7. The baseband processing assembly of claim 1, wherein the resource assignment information are provided according to at least one radio access technology.

8. The baseband processing assembly of claim 1, wherein the first user packet scheduler is operable to:
receive scheduling conditions information for the first user;
process the received scheduling conditions information, thereby determining modulation and coding schemes and antenna selection for data transmission on the channel;
send to the cell scheduler a resource message indicative of the modulation and coding schemes and antenna selection;
receive a response from the cell scheduler indicative of radio resource blocks information for the channel and a confirmation of the determined modulation and coding scheme (MCS) and antenna selection; wherein the resource assignment information comprises the MCS, antenna selection and the radio resource blocks information.

9. The baseband processing assembly of claim 8, wherein the first user packet scheduler is further operable to:
determine processing resources required for establishing the channel using the resource assignment information;
send a resource request message to a Local Resource Manager, LRM, of the baseband processing assembly indicative of the determined processing resources;
receive a resource grant message from the LRM.

10. The baseband processing assembly of claim 8, wherein the cell packet scheduler is operable to:
receive an allocation priority of each user of the group of users from a respective assigned user packet scheduler of the set of user packet schedulers;
sort the group of users by the allocation priority;
in response to a determination that available radio resources are not sufficient for the group of users, selecting a subgroup of users of the group of users having lowest allocation priority and perform one of:
excluding users of the subgroup;
modifying the modulation and coding schemes for the subgroup of users;
modifying the antenna selection for the subgroup of users.

11. The baseband processing assembly of claim 8, wherein in case the channel is a downlink channel, the received scheduling conditions information comprises a channel state information, CSI, including a channel quality indicator, CQI, of the first user, a negative acknowledgement, NACK, indicator in case of needed retransmission, and precoding matrix indicator, PMI; rank indicator for the channel, Quality of Experience, QoE, metrics comprising each a performance characteristic for the channel; and an Radio Link Control, RLC, buffer size of the channel.

12. The baseband processing assembly of claim 8, wherein in case the channel is an uplink channel, the received scheduling information comprises a channel state information (CSI) including a channel quality indicator (CQI) of the first user, precoding matrix indicator (PMI), rank indicator for the first channel, and negative acknowledgement (NACK) indicator in case of needed retransmission, scheduling request for at least one uplink component carrier, and a buffer status report of the first user.

13. A multi-baseband processing assembly system comprising a first baseband assembly and a second baseband assembly according to claim 1, wherein the first baseband assembly and second baseband assembly are linked via a low latency backhaul link to exchange data between the second set of user packet schedulers of the second baseband assembly and the cell packet scheduler of the first baseband assembly for assigning resources for a group of users corresponding to a first radio cell served by the first baseband processing assembly using data exchanged between the first set of user packet schedulers of the second baseband assembly and the first cell packet scheduler.

14. A method for processing signals of at least one remote radio head in a baseband processing assembly, the at least one remote radio head serving a radio cell of a cellular communication system, the baseband processing assembly comprising a set of user packet schedulers and a cell packet scheduler, wherein the cell packet scheduler is assigned to the radio cell, wherein the set of user packet schedulers are assigned to a group of users associated to the radio cell, the method comprising exchanging data between the cell packet scheduler and the first user packet scheduler; providing resource assignment information and establishing a channel with the first user of the group of users using the resource assignment information.

15. A computer program product comprising computer executable instructions to perform the method of claim 14 when executed by a processor.

* * * * *